United States Patent [19]

Kupfrian

[11] 3,922,134
[45] Nov. 25, 1975

[54] PIPE BENDING MANDREL

[75] Inventor: Wilbur J. Kupfrian, Binghamton, N.Y.

[73] Assignee: Robintech Incorporated, Fort Worth, Tex.

[22] Filed: Dec. 17, 1973

[21] Appl. No.: 425,318

[52] U.S. Cl. ............... 425/292; 425/393; 425/403; 425/384; 425/389; 249/65
[51] Int. Cl.² B29C 17/06; B29C 17/07; B29D 23/03
[58] Field of Search ........... 425/384, 392, 393, 389, 425/403; 249/65, 179, 183

[56] References Cited
UNITED STATES PATENTS

| | | | |
|---|---|---|---|
| 2,315,634 | 4/1943 | McCall | 249/179 |
| 2,888,712 | 6/1959 | Kramer et al. | 425/392 |
| 2,977,658 | 4/1961 | Smith et al. | 249/65 |
| 3,120,028 | 2/1964 | Streeter et al. | 249/183 |
| 3,425,093 | 2/1969 | Ansette | 425/393 X |
| 3,432,887 | 3/1969 | Poux et al. | 425/393 X |
| 3,562,860 | 2/1971 | Rottnec et al. | 249/183 X |
| 3,806,301 | 4/1974 | Osterhagen et al. | 425/393 |

*Primary Examiner*—J. Howard Flint, Jr.
*Attorney, Agent, or Firm*—Wilbur J. Kupfrian

[57] ABSTRACT

A method and means for bending pipe and other hollow bodies into arcuate shape while restraining collapsing tendencies of the walls by supporting the pipe internally on a close-fitting, crush-resistant flexible arbor, and expanding the arbor size by applying pressurized fluid within an annular deformable chamber or within flexible tubing wound helically about the periphery of the arbor. When bending thermo-plastic pipe which previously has been heated to above the deformation temperature in the areas to be deformed, circulating pressurized fluid also serves as a heat exchanger, hastening the cooling process.

12 Claims, 4 Drawing Figures

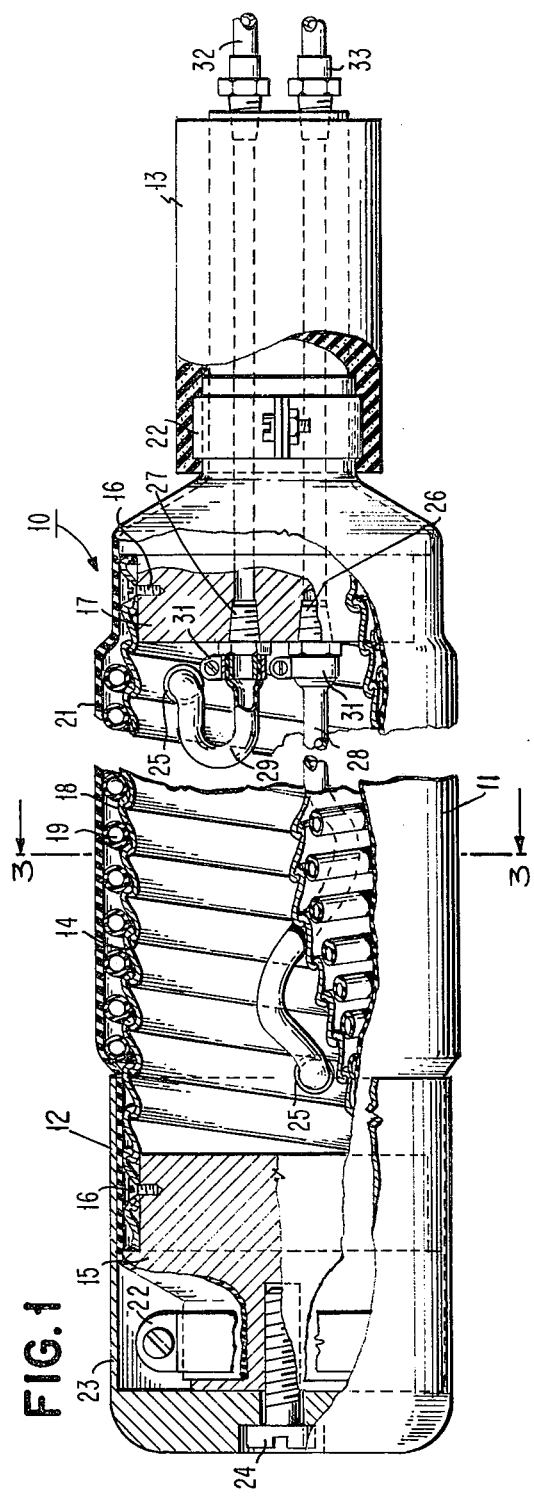
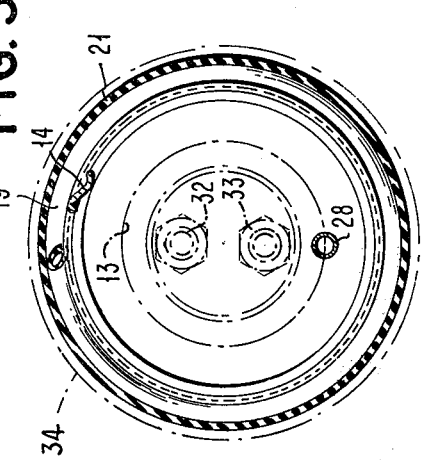
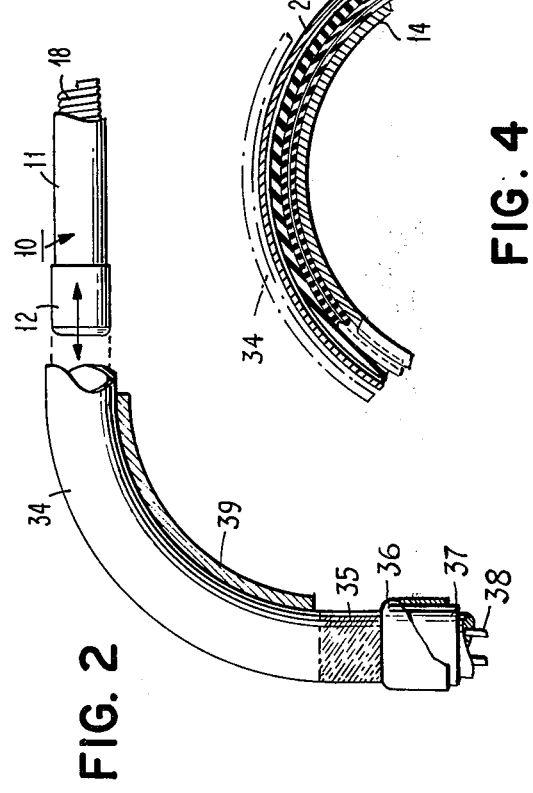

PIPE BENDING MANDREL

BACKGROUND OF THE INVENTION

It is customary to form relatively large radius elbows or sweeps by bending straight sections of pipe, particularly where the materials involved are readily deformable or may be made so as by thermal or chemical means. In most instances, particularly with larger sizes of pipe or where relatively thin walls are involved, such pipe tends to buckle during the bending operation, creating a fold that projects into the channel weakening the structure and reducing the cross-sectional area and restricting the path of flow. In many applications, typically with thermo-plastic conduit intended to enclose telephone or power cables, the specifications tolerate little or no impairment of the cross-sectional area or of the original shape. One standard test for a satisfactory bend is that a ball having a diameter just a little smaller than that of the original inside of the conduit be capable of rolling freely from one end to the other after the bend is completed.

Various expedients have been employed to resist buckling during forming. One popular method consists of filling the tube or pipe with a generally incompressible granular material of which sand and cereal grains such as barley are typical. The operation is time consuming and relatively inefficient, particularly in that the ends must be well plugged after filling and unplugged again and the material removed at completion of the operation. Mechanical expedients such as closely wound springs have been used as mandrels, but especially in larger sizes, the spring turns do not space themselves uniformly as the bend is formed, the turns leave objectionable helical marks where the material to be formed is of a soft nature, and the mandrels have limited constriction range and hence do not tolerate any appreciable variation in pipe or conduit size. Compressed fluids have been used to apply internal pressure while forming the bend, but they tend to act on the walls unevenly except where a surrounding sectional mold controls the final outer contour, and machine and operating costs tend to become unreasonably high, and such surrounding molds require the pipe to have relatively close diameter tolerances.

It is believed that most of the defects of the prior art have been overcome in the present invention by utilizing a flexible but generally crush-resistant arbor having a cross-sectional shape somewhat closely matching the inside of the tubular body to be formed and using one or more expandable layers about the periphery of the arbor to selectively engage the inner wall of the tubular body and thereby inhibit tendencies for this wall to collapse or generate folds during the bending operation. R. C. Pratt U.S. Pat. No. 2,826,784 dated Mar. 18, 1958, discloses a rigid type mandrel for molding straight plastic pipe sections with a peripheral pressure zone employed for expanding the pipe wall against the internal surfaces of a cylindrical mold. Besides requiring precise and relatively expensive molds, the Pratt construction requires that the high-pressure zone be suitably sealed against leakage to the atmosphere. In the present invention, the pressurized portions of the system are completely self-contained and permanently sealed, without packing glands, and accommodate whatever moderate relative motion of the parts is required during the bending operation. Where prior art devices use compressed fluids to substitute for a mechanical arbor, the system is unnecessarily wasteful of the compressed fluid, as during each cycle it must fill the complete inner cavity being formed.

SUMMARY OF THE INVENTION

This invention contemplates utilizing a specially-formed flexible mandrel or arbor to be inserted within a readily deformable tube or conduit, and after the mandrel is properly located and the tube adequately secured at one end, a peripheral zone or layer of the mandrel is made turgescent to forcefully engage the inner walls of the tube. The central arbor has inherent crush resistance but readily flexes into arcuate shape as defined usually by a template or cradle against which the tube or pipe is urged so as to impart predetermined bend characteristics. The pressure from the swollen peripheral zone is exerted quite uniformly against the inner surfaces of the tube or pipe and effectively overcomes the creation of inward folds or wrinkles. Preferably the peripheral zone is composed of a wrapped layer or layers typically of relatively small diameter flexible tubing arranged in a helically wrapped pattern with turns substantially abutting to provide separate but closely spaced and well-distributed contact areas between the peripheral zone and the inner surface of the tube.

A flexible arbor provides a foundation for the turgescent peripheral layer or wrapping and may be formed of a solid elastomeric material such as rubber of medium durometer, having reasonable resistance to crushing forces, yet being resilient enough to be bent into an arc corresponding to a predetermined radius of curvature. More conveniently the arbor is formed of flexible metal or other tubing having the desired flexibility. Various types are readily available with known radius of bend characteristics and of desired strength, wall thickness, and diameter. A preferred type having light weight and relatively good flexibility is used as electrical conduit and is known in the trade as Greenfield duct. This conduit is available in either aluminum or galvanized steel in a wide range of diameters, and even is available in special diameters, generally without additional tooling costs, being a spirally wrapped metallic strip with a degree of interlock between the turns. Other flexible hose of standard design often as used with vacuum cleaning machines or dust collectors may be used as well. One advantage of the spirally wrapped hose is the advantage it provides in establishing a helical path formed between convolutions around which an elastomeric tubing layer may be wound and anchored. A flexible skin or covering, preferably of durable rubber, may be located about the peripherally-wound tubing to simplify insertion of the mandrel within the pipe to provide better distribution of the areas of applied pressure, and to provide mechanical protection.

The mandrel device is particularly adapted to bend readily-deformable tubes, whether the tubes are inherently soft, e.g., lead pipe, or whether rendered soft by heating, e.g., rigid plastic conduit, or by other means. Typically, the apparatus is adapted to bending rigid polyvinyl chloride (PVC) or other thermo-plastic conduits, tubes, and pipes to meet standard specifications for radius of bend, wall thickness, roundness of crossection and the like. In these instances, precut straight tubular blanks are preheated to above the deformation temperature by traditional methods as by exposure to an oven atmosphere, by convection air currents flowing within the conduit, by exposure to radiant energy, or a combination of these methods. One popular method I have employed is to partially heat the straight blanks by passing them progressively through a preheating oven to a temperature of the order of 125 or more degrees F., at which temperature they still may be handled without serious discomfort, without them having reached the softening point. They then may be rotated on heated rollers or on a cradle in close proximity to sources of radiant energy to raise to the softening point those areas destined to be deformed during the bending operation.

With such materials and with the turgescent layer activated by circulating therein cool fluid under reasonable pressure, a desirable heat exchange action takes place, restoring the plastic tubing to rigid condition, and the coolant is confined within a closed system without the need for packing glands or stuffing boxes, so the likelihood of fluid leakage is greatly minimized.

Other advantages are realized from the present arrangement. The fluid required to expand the mandrel and thereby apply pressure to the tube walls is a small percentage of the volume of the cavity and is economical on fluid use as compared with systems that feed fluid into and fill the entire cavity. Additionally, by the use of a confined peripheral zone, typically as provided by the use of spirally wound elastomeric tubing, excellent control of expansion as a function of fluid pressure is provided, as large variations in pressure produce relatively small changes in overall size, or outside diameter in the case of cylindrical tubes.

BRIEF DESCRIPTION OF THE DRAWINGS

FIG. 1 is a longitudinal elevational view of the mandrel assembly with most of the parts cut away to show interior construction;

FIG. 2 is an elevational view of the forward end of the mandrel upon withdrawal from a plastic tube following the forming operation;

FIG. 3 is a cross-sectional view of the mandrel taken along the lines 3—3 of FIG. 1, wherein the peripheral zone is in a turgescent state, in condition to apply pressure to the inner walls of a tubular body; and, FIG. 4 is a partial cross-sectional view, particularly of the arbor and associated parts with the peripheral zone in a quiescent or retracted state.

DETAILED DESCRIPTION OF THE DRAWING

Referring now to the drawing and particularly to FIGS. 1 and 3 thereof, the invention comprises a flexible mandrel 10 and is shown as being formed of a core or arbor 14 whose principal function it is to occupy the major portion of the cavity formed by the tube to be bent, and to offer a foundation on which a peripheral zone 19 might be formed, best seen in FIG. 3. The arbor 14 is crush resistant, while having a snake-like lateral flexibility, so that it may oppose the pressure applied outwardly against the tube wall, yet being resilient with respect to its own axis so that it may yield in conformity with the bend to be formed in the tube. It is unimportant functionally, therefore, whether the arbor be solid or hollow, though I prefer to employ a hollow arbor because of the satisfactory manner in which it performs, the ease with which it accepts associated parts, and because of its light weight and low cost. Most any flexible tube or vacuum system type duct should provide the necessary crush resistance to radial forces while allowing lateral displacement or curving of the neutral axis from the straight position. Although the principles of the invention are not dependent upon any particular cross-sectional shape, tubes and pipes are most commonly cylindrical, and for ease in illustration, the invention is described as applied to the bending of pipes or conduits of circular cross-section. The arbor 14 therefore is shown to be round, and its outside diameter determined primarily by the inside diameter of the pipe to be formed, less the thickness of one or more layers forming the peripheral zone 19 that in a quiescent state allows suitable clearance for inserting and withdrawing the mandrel.

A light-weight metal tube or hose composed of partially or completely interlocked and helically wound preformed strip 18, and of the type often used for armoring electrical conductors, has been found satisfactory. The material is readily available in a wide range of diameters, and the ease of manufacture lends itself to the formation of special sizes with practically no change in tooling. The strip 18 as shown provides some interlock between adjoining turns which increases the crush resistance of the mandrel while allowing moderate sliding of parts at the overlapped portions of the strip so that during a flexing operation the outer periphery of the bend expands while the inner periphery of the bend contracts, which desirably gives bending substantially about the neutral axis with little or no net change in the length from the straight condition.

The strip 18 provides convolutions and grooves between adjoining turns that help to locate and secure the peripheral expandable zone 19. This zone may comprise a single or multiple section annular chamber, or a multiple section annular chamber formed of a succession of axially-separated elemental annular zones formed of rubber or the like. Closer dimensional control, lower cost, and other advantages result from thus generating an annular chamber by the use of a succession of such ring-like or encircling elastomeric pressures, as by a helically-wrapped layer of flexible tubing, best seen in the expanded state in FIG. 1. Heat resistant rubber is satisfactory, but excellent results have been obtained using conventional electrical insulating sleeving having fully enclosed elastomeric walls formed in a wide range of sizes of plasticized polyvinyl chloride (PVC) or equivalent. The diameter of the tubing used is determined by the required flow of fluid for subsequent heat exchange needs, but preferably in a flattened quiescent condition has a width that roughly spans the distance between adjoining passages or convolutions, thereby quite completely covering the outer surface of the arbor 14 and providing better pressure distribution to the inside surfaces of the pipe being bent.

The length of the mandrel is naturally determined by the required length of bend, and the arbor is cut to suit beforehand. A pilot 12 is provided at the forward end of the mandrel to guide the assembly during the insertion process and is illustrated herein as a cup formed preferably of aluminum or stainless steel. The forward wall of the pilot is apertured centrally to receive a mounting screw 24 which secures the pilot to a terminal plug 15, which latter is necked down to anchor the forward end of the arbor 14 as by screws 16 extending radially inward through the strip 18, the forward end being enclosed within the skirt portion 23 of the pilot 12. A similar terminal plug 17 is provided at the opposite end of the mandrel to which the rearward end of the arbor is attached also by screws 16. A suitable handle 13 projects coaxially from the plug 17 to assist the operator in manipulating the mandrel, and a tubular cover of sponge rubber or the like may be used as shown in FIG. 1, to provide a more effective grip for the operator and to thermally insulate against the effects of a coolant flowing through the handle, as will appear.

The peripheral expandable zone is shown to be of helically wrapped tubing extending in a zone between the rigid terminals defined by the pilot 12, handle 13, and the terminal plugs 15 and 17 and forming with the arbor, a flexible intermediate section 11. The tubing normally lies in the grooves or interstices formed between adjoining turns of the metal hose. Preferably the ends of tubing 19 extend through grommeted holes 25 in the preformed strip 18 as shown, and the forward connecting section 28 and rearward connecting section 29 are provided with sufficient slack to permit assembly and disassembly. The ends are secured to nipples 26 and 27 respectively which in turn are threaded within the terminal plug 17 and communicate with pressurized fluid supply connections 32 and 33 as by ducts extending through handle 13 as shown in FIG. 1. Clamps 31 may be used to hold the tubing ends securely to the nipples 26 and 27, and thereby better insure against fluid leakage.

Although the unit thus far described is functional without further additions, I prefer to add an outer flexible cover or skin 21, typically of heat-resistant rubber, as a physical protection for the helically wrapped tubing and to provide a smoother outer periphery when the mandrel is inserted and withdrawn from the conduit. A rubber of good flexibility and of relatively good tensile strength with resistance to moderately high temperatures is recommended. I have successfully used rubber of the type used for automobile inner tubes. The rubber covering also tends to more evenly apply to the inner surface of the pipe, the forces generated within the axially spaced annular zones such as the wrapped tubing, and if stretched into place during assembly, the rubber acts as a constricting agent, urging the mandrel to its minimum diameter by compressing the layer 19 when fluid pressure is removed, as shown in FIG. 4. Clamps 22 may be used to securely hold the ends of the rubber cover in place on reduced diameter portions of the terminal plugs 15 and 17.

MODE OF OPERATION

The mandrel is shown in FIG. 2 as applied to a typical bending operation. The pilot 12 is shown in position to be inserted into the tube being fed endwise before the bending operation and withdrawn after bending as suggested by the dual headed arrow. With the peripheral layer in a quiescent state, that is, with little or no fluid flowing through tubing 19, the rubber cover 21 constricts the peripheral layer, and the diameter of the intermediate flexible section is minimized, being shown as smaller even than the pilot 12, and providing an annular space between the mandrel and the inside wall of a section of pipe or conduit 34 as best seen in FIG. 4. This represents the relationship of the parts at the beginning of the bending cycle at the time that the mandrel is inserted within the pipe. The layer 19 is seen to be quiescent or contracted and it lies in a relatively flattened state against the arbor 14.

To initiate a bend, a section of pipe or conduit to be formed, is clamped at one end, and the mandrel is inserted usually while the pipe section or blank is straight. A fluid under sufficient pressure to render the layer 19 turgescent or swollen is applied either statically or as a circulating medium from a suitable source to connections 32 and 33 to swell the mandrel against the inner walls of the conduit 34 as shown in FIG. 3, and the pipe is forced transversely into the desired bend, either manually or by mechanical means (not shown). With proper forces within the tubing 19 to overcome the wrinkling tendencies of the conduit, a smooth bend is formed that substantially maintains the original circular contour of the conduit.

To better illustrate the turgescent action by the application of fluid pressure, FIG. 1 shows the unconfined mandrel 10, tubing 19 fully dilated, and wherein the walls of the tubing 19 are stretched moderately to full round contour. The forces applied by the tubing layer to the rubber cover 21 in turn swell the flexible portion 11, shown here as well beyond the confines of the pilot 12. In actual use, however, the entire mandrel is constrained by the resistance offered by the conduit walls, and the tubing 19 normally is distorted to a deltoid shape, being flattened in the areas defining the outer periphery of the mandrel where the tubing meets resistance, and the area of contact between the tubular zone 19 and the conduit is increased, lessening any tendency for the helical pattern to be imparted to the conduit 23.

In a more specific example, let us assume a pipe or conduit 34 of rigid PVC or similar material is to be formed. The material usually is generated by extrusion in continuous lengths that are cut into suitable blanks which may be oven heated until the blanks have reached a temperature above the softening point, with PVC usually above 190°F. I prefer, however, to use an oven for preheating the blanks to a range below 140°F. that allows reasonably comfortable handling of the blanks, after which I provide localized supplemental heat as by radiant heaters to all zones of the straight blank that are to be deformed during the bending operation. Most pipe bends are made to specifications that provide for a straight section at or near each end, which sections are not bent and hence do not require such supplemental heat. Such sections also, being cooler, may be handled more conveniently. In FIG. 2, a completed bend is shown formed from such a differentially-heated blank, the shaded portion 35 having been left at a temperature below the softening point while the blank was in its original straight condition. This local cooler portion, being rigid, offers additional advantages in allowing the pipe end to be forcefully inserted over a sizing tool 37 that may provide accurate terminal dimensions while at the same time anchoring the conduit 34 for the subsequent bending procedure. The tool 37 may in turn be provided with cooling fluid circulating from a suitable source through tubular connections 38, and it may be provided with pneumatic or similar retracting mechanism all of conventional design (not shown), particularly if the conduit becomes wedged on the tool during cooling. Such binding is a common condition, particularly where the tool 37 represents a form designed to expand the softened end of the conduit into a tapered end bell 36 to receive an untreated end of an adjoining conduit. Thus by differentially heating the blank, a relatively cool rigid portion 35 provides the stiffness essential to force the softened end over the sizing tool. Without the cool portion the softened conduit simply buckles and fails to develop the force required to generate an end bell or even to slide over a tight-fitting sizing tool.

The actual bending operation is done in a rapid sequence starting with the removal of a heated and softened blank conduit from a suitable oven or radiant heating unit, both of conventional design. One end of the conduit 34 is suitably secured, with or without end-forming, in the manner shown diagrammatically in FIG. 2, and the quiescent mandrel 10 is inserted until the pilot 12 is located within the straight portion 35. Fluid preferably cold water from a refrigerated supply is immediately circulated under a reasonably high pressure, usually in the range of from 20 p.s.i. to 45 p.s.i. through the layer formed by the expandable tubes 19. Simultaneously, and before the wall surfaces of the conduit 34 become chilled, the required deformed length of combined conduit 34 and mandrel 10 is pressed laterally progressively along a properly located template 39 to impart the required radius of bend. If the walls of the conduit are relatively thin and more prone to buckle, the template may have side plates or be formed as a saddle to embrace and support the conduit walls, to further minimize deformation tendencies, all as is well known in the art. The pipe or conduit is held in the desired position as by clamps (not shown) while the peripheral zone remains expanded as shown in FIG. 3, the cooling fluid meanwhile hastening the cooling operation. When the conduit becomes thermally set, the pressure is removed, the outer surface of the mandrel contracts, as shown in FIG. 4, and the mandrel is withdrawn as shown in FIG. 2.

Auxiliary equipment that is of conventional designs has not been shown in the drawing. For example, heating ovens are well known and usually consist of a thermally-insulated chamber with thermostatically controlled heating elements. The blanks roll by gravity or are conveyed through the chamber at a controlled rate. If supplemental heating is required, the heating chamber may empty the blanks onto rotating rollers where the outer periphery is progressively exposed to electrically energized radiant heaters (often with quartz windows) throughout part or all of the length of the blank. By suitable omission of one or more of these radiant heaters, the blank may be differentially heated to form the cooler portions as described.

I have shown the principles of the present invention as embodied in a typical application related to the bending of cylindrical thermoplastic pipe. Obviously, the principles apply to other shapes and other materials as well as I contemplate all aspects properly within the scope of the appended claims.

I claim:

1. A mandrel insertable within a tube for supporting the interior walls of said tube and for inhibiting change in maintaining the cross-sectional contour of said walls while said tube is bent into a curved shape, said mandrel comprising a flexible central core member having a cross-sectional pattern corresponding in shape to but being smaller than the passageway through said tube, said core member being crush resistant, and an expandable peripheral zone enclosing said flexible core said zone being formed of a series of closely adjoining but axially-spaced encircling interconnected passages fully enclosing walls responsive to fluid pressure within said passages for expanding said elastomeric walls into resilient contact with adjoining areas of said core member while applying pressure to said interior walls throughout the portion of said tube to be bent, said zone being responsive upon dissipation of said pressure to recede from said interior walls, whereby sufficient peripheral clearance is developed to permit retraction of said mandrel from said tube following the bending operation.

2. A mandrel as claimed in claim 1, including means for admitting and discharging circulating cooling fluid through said passages at sufficient pressure to expand said zone into firm heat-exchange contact with said interior walls.

3. A mandrel as claimed in claim 1, wherein said passages comprise elastomeric tubing spirally wrapped about said core.

4. A mandrel as claimed in claim 1, including an elastomeric cover encircling said annular passages, to provide more uniform distribution of pressure against said interior walls, and to assist in constricting said passages when said pressure is removed.

5. A mandrel insertable within a thermo-plastic, heat-softened conduit for supporting the walls of said conduit during a bending operation, said mandrel comprising a central arbor formed of flexible crush-resistant hose, an expandable peripheral zone comprising elastomeric tubing helically wrapped about said hose, and means for expanding said zone after said mandrel has been inserted within said conduit, said means comprising connections for admitting fluid under pressure to within said tubing, whereby said tubing is expanded for applying pressure to the inner walls of said conduit while said conduit is being bent.

6. A mandrel as claimed in claim 5 wherein said arbor is a hose formed of helically-wound interlocked strip, adjoining interlocked turns being susceptible to slight relative axial motion, whereby said arbor bends substantially about its neutral axis.

7. A mandrel as claimed in claim 6, wherein said elastomeric tubing is wrapped about said arbor so as to lie in the grooves formed between adjacent turns.

8. A mandrel as claimed in claim 5 including an elastomeric cover formed about said peripheral zone, and positioned so as to be located in use between said zone and the walls of said conduit thereby to impart to said walls pressure generated by said expanding zone.

9. A mandrel as claimed in claim 8, wherein said cover is stretched about said peripheral zone and has sufficient force to constrict said tubing and to reduce the outside diameter of the central arbor portion of said mandrel when said pressure is reduced.

10. A mandrel as claimed in claim 5 including a pilot formed at one end of said mandrel for guiding said mandrel within said conduit.

11. A mandrel as claimed in claim 5 including a pilot formed at one end of said mandrel for guiding said mandrel within said conduit, and including an elastomeric cover surrounding said peripheral zone and being secured at one end within said pilot.

12. A mandrel as claimed in claim 5 including an elastomeric cover for said peripheral zone, a pilot at one end of said mandrel, a handle at the opposite end of said mandrel, and internal connections for conducting fluid under pressure through said handle into communication with said tubing.

\* \* \* \* \*

UNITED STATES PATENT OFFICE
CERTIFICATE OF CORRECTION

Patent No. 3,922,134   Dated November 25, 1975

Inventor(s) Wilbur J. Kupfrian

It is certified that error appears in the above-identified patent and that said Letters Patent are hereby corrected as shown below:

Column 4, line 23, after "strip" insert -- , --.

Lines 37 and 38, delete "pressures" and insert -- passages --.

Column 7, line 61, after "passages" insert --having elastomeric--

Signed and Sealed this

Third Day of August 1976

[SEAL]

Attest:

RUTH C. MASON
Attesting Officer

C. MARSHALL DANN
Commissioner of Patents and Trademarks